United States Patent
Cloud et al.

(10) Patent No.: US 8,845,899 B2
(45) Date of Patent: Sep. 30, 2014

(54) FILTER ELEMENT AND METHODS OF MANUFACTURING AND USING SAME

(71) Applicant: Perry Equipment Coporation, Mineral Wells, TX (US)

(72) Inventors: Dan Cloud, Ganbury, TX (US); John A. Krogue, Mineral Wells, TX (US)

(73) Assignee: PECOFacet (US), Inc., Mineral Wells, TX (US)

( * ) Notice: Subject to any disclaimer, the term of this patent is extended or adjusted under 35 U.S.C. 154(b) by 0 days.

(21) Appl. No.: 13/922,508

(22) Filed: Jun. 20, 2013

(65) Prior Publication Data

US 2013/0277295 A1    Oct. 24, 2013

Related U.S. Application Data

(60) Continuation of application No. 13/611,755, filed on Sep. 12, 2012, now Pat. No. 8,499,939, which is a division of application No. 13/278,689, filed on Oct. 21, 2011, now Pat. No. 8,293,106, which is a division of application No. 11/607,364, filed on Dec. 1, 2006, now Pat. No. 8,062,523.

(51) Int. Cl.

| | |
|---|---|
| B01D 63/00 | (2006.01) |
| B01D 39/14 | (2006.01) |
| B01D 25/00 | (2006.01) |
| B01D 27/06 | (2006.01) |
| B01D 29/11 | (2006.01) |
| B01D 46/00 | (2006.01) |
| B01D 46/52 | (2006.01) |
| C02F 1/44 | (2006.01) |
| B01D 29/33 | (2006.01) |
| B01D 29/58 | (2006.01) |

(52) U.S. Cl.
CPC .............. *B01D 39/14* (2013.01); *B01D 29/33* (2013.01); *B01D 29/58* (2013.01); *B01D 2201/32* (2013.01); *B01D 25/001* (2013.01); *B01D 27/06* (2013.01); *B01D 29/111* (2013.01); *B01D 46/0001* (2013.01); *B01D 46/0024* (2013.01); *B01D 46/528* (2013.01); *B01D 2201/02* (2013.01)
USPC ................................. 210/321.85; 210/321.76

(58) Field of Classification Search
CPC ........ B01D 39/14; B01D 27/06; B01D 29/58; B01D 29/33; B01D 2201/32; B01D 2201/065; B01D 2201/1258
See application file for complete search history.

(56) References Cited

U.S. PATENT DOCUMENTS

| 2,703,441 A | 3/1955 | Langdon et al. |
| 2,774,294 A | 12/1956 | Kahle |

(Continued)

FOREIGN PATENT DOCUMENTS

| DE | 3438098 | 4/1986 |
| RU | 02305017 | 8/2007 |
| WO | WO 2006/074383 | 7/2006 |

OTHER PUBLICATIONS

European Search Report issued in European Application No. 13190508.5 mailed on Jan. 30, 2014.

(Continued)

*Primary Examiner* — Katherine Zalasky
(74) *Attorney, Agent, or Firm* — Greenberg Traurig, LLP; Chinh H. Pham; Natalie Salem

(57) ABSTRACT

A coreless and spirally wound non-woven filter element is provided. The filter element includes at least one band of base media having a selected porosity and an interlay having a different porosity within at least one band of base media. The presence of the interlay in the filter element can create additional surface area within the contiguous construction of a filter element for filtration. This interlay can also create the ability to change direction of flow and to increase the deposition of specifically sized contaminants.

19 Claims, 7 Drawing Sheets

(56) References Cited

U.S. PATENT DOCUMENTS

| | | | |
|---|---|---|---|
| 2,890,497 | A | 6/1959 | Langdon et al. |
| 3,042,216 | A | 7/1962 | Goldman |
| 3,262,578 | A * | 7/1966 | Dennis ................... 210/489 |
| 3,289,847 | A | 12/1966 | Rothemund |
| 3,744,092 | A | 7/1973 | Auten |
| 4,101,423 | A | 7/1978 | Merrill et al. |
| 4,153,661 | A | 5/1979 | Ree et al. |
| 4,199,447 | A | 4/1980 | Chambers et al. |
| 4,266,408 | A | 5/1981 | Krause |
| 4,586,760 | A | 5/1986 | Welker |
| 4,877,527 | A | 10/1989 | Brownell |
| 4,986,909 | A | 1/1991 | Rai et al. |
| 5,057,368 | A | 10/1991 | Largman et al. |
| 5,062,948 | A | 11/1991 | Kawazoe et al. |
| 5,080,799 | A | 1/1992 | Yan |
| 5,082,568 | A | 1/1992 | Holler |
| 5,114,582 | A | 5/1992 | Sandstrom et al. |
| 5,120,435 | A | 6/1992 | Fink |
| 5,122,276 | A | 6/1992 | Loikits |
| 5,133,864 | A | 7/1992 | Vaughn et al. |
| 5,189,092 | A | 2/1993 | Koslow |
| 5,227,071 | A | 7/1993 | Torline et al. |
| 5,264,162 | A | 11/1993 | Salem et al. |
| 5,358,552 | A | 10/1994 | Seibert et al. |
| 5,409,515 | A | 4/1995 | Yamamoto et al. |
| 5,510,565 | A | 4/1996 | Tan et al. |
| 5,626,748 | A | 5/1997 | Rose |
| 5,665,516 | A | 9/1997 | Kokelenberg et al. |
| 5,668,079 | A | 9/1997 | Tavlarides et al. |
| 5,762,797 | A | 6/1998 | Patrick et al. |
| 5,827,430 | A * | 10/1998 | Perry et al. ............... 210/497.01 |
| 5,885,076 | A | 3/1999 | Ralls et al. |
| 5,893,956 | A | 4/1999 | Perry, Jr. et al. |
| 5,897,779 | A * | 4/1999 | Wisted et al. .................. 210/651 |
| 5,902,480 | A | 5/1999 | Chilton et al. |
| 6,153,098 | A | 11/2000 | Bayerlein et al. |
| 6,274,041 | B1 | 8/2001 | Williamson et al. |
| 6,309,546 | B1 | 10/2001 | Herrmann et al. |
| 6,326,326 | B1 | 12/2001 | Feng et al. |
| 6,436,294 | B2 | 8/2002 | Lundquist |
| 6,492,183 | B1 | 12/2002 | Perman et al. |
| 6,887,381 | B2 | 5/2005 | Rohrbach et al. |
| 2001/0042440 | A1 | 11/2001 | Miyazawa et al. |
| 2002/0011446 | A1* | 1/2002 | Lundquist ................... 210/660 |
| 2003/0034293 | A1 | 2/2003 | Simonetti |
| 2003/0181561 | A1 | 9/2003 | Li et al. |
| 2004/0004110 | A1 | 1/2004 | Blackburne, Jr. |
| 2005/0103713 | A1 | 5/2005 | Ramsey et al. |
| 2005/0205469 | A1 | 9/2005 | Klabunde et al. |
| 2006/0065594 | A1 | 3/2006 | Armstrong et al. |
| 2007/0071657 | A1 | 3/2007 | Okubo et al. |
| 2007/0256980 | A1 | 11/2007 | Krogue et al. |
| 2007/0262025 | A1 | 11/2007 | Krogue et al. |
| 2008/0099375 | A1 | 5/2008 | Landau et al. |
| 2008/0128364 | A1 | 6/2008 | Cloud et al. |
| 2009/0032472 | A1 | 2/2009 | Krogue et al. |
| 2010/0252066 | A1 | 10/2010 | Kaiser |

OTHER PUBLICATIONS

Lin et al., "Selective Sorption of Cesium Using Self-Assembled Monolayers on Mesoporous Supports", Environmental Science & Technology, vol. 35, No. 19, published on Web Aug. 24, 2001, pp. 3962-3966.
PCT International Search Report based on PCT/US07/24603 dated Apr. 3, 2008.
Office Action in U.S. Appl. No. 11/888,301 mailed Jun. 30, 2010.
Office Action in U.S. Appl. No. 12/644,676 mailed Dec. 30, 2010.
Office Action cited in U.S. Appl. No. 11/731,230 mailed Apr. 4, 2008.
Office Action cited in U.S. Appl. No. 11/731,230 mailed Sep. 10, 2008.
Office Action cited in U.S. Appl. No. 11/731,230 mailed Dec. 19, 2008.
Office Action cited in U.S. Appl. No. 11/731,230 mailed Jun. 15, 2009.
Office Action cited in U.S. Appl. No. 12/644,676 mailed Jun. 10, 2011.
Office Action cited in U.S. Appl. No. 11/888,301 mailed Dec. 22, 2010.
Office Action cited in U.S. Appl. No. 11/888,301 mailed Apr. 27, 2011.
Supplemental European Search Report cited in European Application No. EP 07862354 dated Mar. 10, 2011.
Office action cited in U.S. Appl. No. 11/607,364 mailed Jan. 21, 2010.
Office action cited in U.S. Appl. No. 11/607,364 mailed Aug. 27, 2010.
Office action cited in U.S. Appl. No. 11/607,364 mailed Apr. 28, 2011.
International Search Report cited in International Application No. PCT/US2007/008243 mailed Jul. 24, 2008.
International Search Report cited in International Application No. PCT/US2007/017103 mailed Jan. 17, 2008.
Office action cited in U.S. Appl. No. 13/278,689 mailed Jan. 11, 2012.
Office action cited in U.S. Appl. No. 13/278,689 mailed Jun. 21, 2012.
Office action cited in U.S. Appl. No. 13/611,755 mailed Oct. 25, 2012.

* cited by examiner

FILTER ELEMENT AND METHODS OF MANUFACTURING AND USING SAME

RELATED APPLICATIONS

The present application is continuation of U.S. application Ser. No 13/611,755, filed Sep. 12, 2012, which is a divisional of U.S. application Ser. No. 13/278,689, filed Oct. 21, 2011, now U.S. Pat. No. 8,293,106, issued on Oct. 23, 2012, which is a divisional of U.S. application Ser. No. 11/607,364, filed Dec. 1, 2006, now U.S. Pat. No. 8,062,523 issued on Nov. 22, 2011, the content of all of which is hereby incorporated herein by reference in their entirety.

TECHNICAL FIELD

The present invention relates to filter elements and methods used in their manufacture.

BACKGROUND ART

There are machines used to manufacture tubular filter elements in a continuous process. U.S. Pat. No. 4,101,423 discloses a tubular filter element made on a single-stage multiple winding machine of helically wound and overlapping layers such as an inner layer of high wet strength, highly porous paper, a second layer of thin microporous filtration material of a sterilizing grade and an outer layer of a porous sheet of expanded polyethylene and an outer porous layer to support the filtration material. The layers are wrapped on a fixed mandrel to be self-overlapping in a single layer overlap and advance in unison along the mandrel as they are wrapped so that there is no relative motion between the adjacent layers of the laminate. An adhesive material that blocks the passage of the particulate matter and bacteria being filtered seals the second filtration layer in the region of overlap. The ends of the tubular laminate construction are impregnated over a predetermined length adjacent to each edge of the construction with a suitable sealing adhesive material such as a polyurethane potting compound. When the adhesive material cures, the end portions provide mechanical support for the tube while blocking the passage of the fluid or the particulate and bacterial contaminants (See Col. 5, Ins. 4-26.)

A circularly wound spiralled chromatographic column is shown in U.S. Pat. No. 4,986,909. Here, a sandwich or laminate of alternating layers of swellable fibrous matrix in sheet form and layers of spacer means, with the periphery of the sandwich is compressed into a fluid-tight configuration. Typically, the peripheral edges of alternating discs of swellable fibrous matrix and spacer means are joined. Preferably, the fibrous matrix contains or has bonded therein a thermoplastic polymeric material, as does the spacer means. The edges may be joined by appropriate heating, e.g. sonic welding. (See Col. 10, Ins. 40-61.)

Another spirally, circularly wound filter element is disclosed in U.S. Pat. No. 5,114,582 and comprises one or more filter elements spirally wound on a cylindrical permeate transport tube. Each filter element comprises a heat-sealed membrane element and a feed spacer. (See Abstract.)

A process for the manufacture of porous tubes of high permeability made from a carbon-carbon composite material in a strip of mat spirally wound on a mandrel is disclosed in U.S. Pat. No. 5,264,162. Porous tubes are made from said material by winding over a mandrel a nonwoven sheet, made from a carbon fiber precursor, followed by compression and hot stabilization of the assembly. The sheet is impregnated by a resin, followed by a thermal carbonization treatment of the resin. Tubes are obtained having a high permeability, small pore diameter and an inner surface of low rugosity. (See Abstract.) Also disclosed is the use of successive mat layers, making it possible to obtain, in the final tube, pore diameters which increase in the direction of the flux to be filtered, generally from the inside towards the outside of the tube. It is advantageous that these pore diameters are substantially in a ratio of 10 between one layer and the next, which may be obtained by adjusting the density of the mat and/or the diameter of the fibers. (See Col. 4, Ins. 10-20.)

A helically wound, single wrap filter element is disclosed in U.S. Pat. No. 5,409,515, including a porous membrane of a polytetrafluoroethylene and one or more sheets composed of fibers made of a thermally melting synthetic resin. (See Abstract.) The sheets are thermally fused over a selected length. (See Col. Ins. 40-46.)

SUMMARY OF THE INVENTION

It is the general object of the invention to provide an improved filter element made with improved methods and machines for their manufacture.

This object is achieved with a filter element made of at least one nonwoven fabric of a homogeneous mixture of a base and a binder material that is compressed to form a mat or sheet of selected porosity. The binder fiber has at least a surface with a melting temperature lower than that of the base fiber. The sheet is formed into a selected geometric shape and heated to thermally fused to bind the base fiber into a porous filter element. The preferred shape is a helically wound tube of plural sheets, each sheet being self-overlapped and compressed to overlap another sheet. Each sheet preferably heated and compressed individually and the sheets may be selected to have different porosities and densities. The binder material is selected from the group consisting of thermoplastic and resin, and the base material is selected from the group consisting of thermoplastic and natural.

The machinery preferably used to produce the filter element employs the a method of manufacture that includes the step of forming a nonwoven fabric of a homogeneous web of a base fiber and a binder fiber, as explained above, compressed to form a sheet of selected porosity. Plural sheets of nonwoven fabric are wrapped helically on a multi-station wrapping machine with individual belts, each powered by a capstan to form individual layers that overlap to form a laminate. The tension of each belt is selected to compress each layer a selected degree. Each layer is heated to accomplish the thermal fusion step. Cooling fluid is pumped through the hollow mandrel to prevent excessive heat build-up in the mandrel. The machine is controlled by a computer, which receives input signals that adjust machine functions such as the capstan driving motor speed, the tensions of the sheet wrapping belts, the temperature of the heater array used to accomplish thermal fusion of each layer, and the flow of cooling fluid flowing through the hollow mandrel.

The above as well as additional objects, features, and advantages of the invention will become apparent in the following detailed description.

DESCRIPTION OF SPECIFIC EMBODIMENTS

Figure 1:
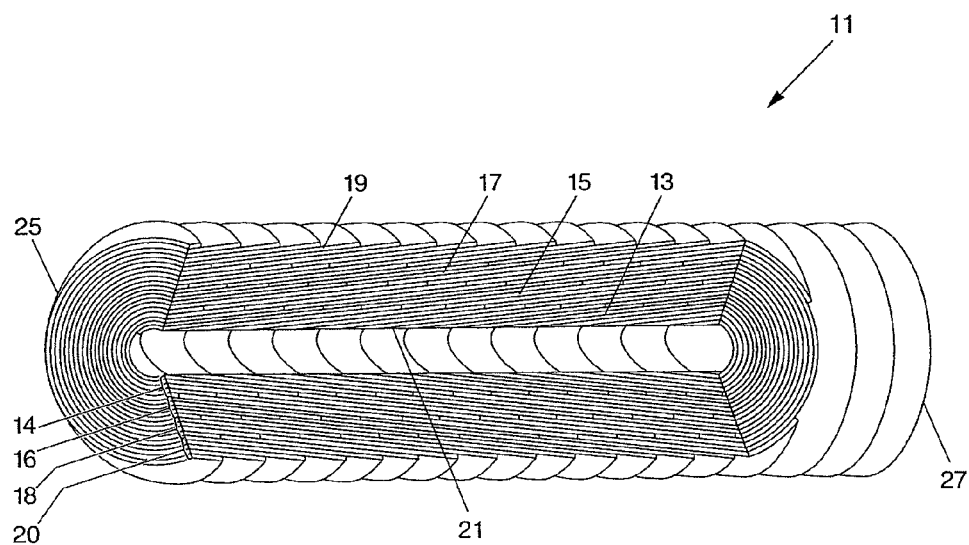
FIG. 1 is a perspective view in partial section of the preferred embodiment of the invention that illustrates a multi-overlapped coreless filter element made in a four station wrapping machine using four rolls of selected nonwoven fabric.

Referring to FIG. 1 of the drawings, the numeral 11 designates a multi-overlapped coreless filter element constructed according to the principles of the invention. It includes a first multi-overlapped nonwoven fabric strip 13, a second multi-overlapped nonwoven fabric strip 15, a third multi-overlapped nonwoven fabric strip 17, and a fourth multi-overlapped nonwoven fabric strip 19. Each fabric strip 13, 15, 17, 19 is spirally or helically wound in overlapping layers to form overlapping bands 14, 16, 18, 20, respectively. The radially interior surface 21 of band 14 forms the periphery of an axially extending annular space (i.e., pathway) that extends from one end 25 of the filter element to the oppositely facing end 27 of the filter element 11. In the drawings the thickness of the fabric is exaggerated.

Figure 2:
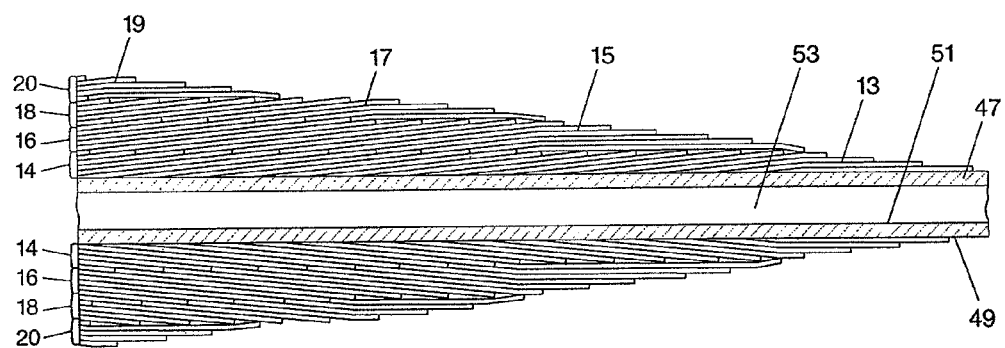
FIG. 2 is a cross-sectional view that illustrates the multi-overlapped coreless filter element of FIG. 1 being formed on a hollow mandrel.

In FIG. 2 of the drawings, the numeral 47 designates a hollow cylindrical mandrel with an annular exterior surface 49 and an annular interior surface 51, said annular interior surface 51 forming the periphery of a cylindrical channel 53, through which flows a liquid or gas heat exchange medium (not shown). Band 14 of multi-overlapped nonwoven fabric strip 13, is shown overlapped by band 16 of multi-overlapped non-woven fabric strip 15, which in turn is overlapped by band 18 of multi-overlapped nonwoven fabric strip 17, which is then overlapped by band 20 of multi-overlapped nonwoven fabric strip 19.

Figure 3:
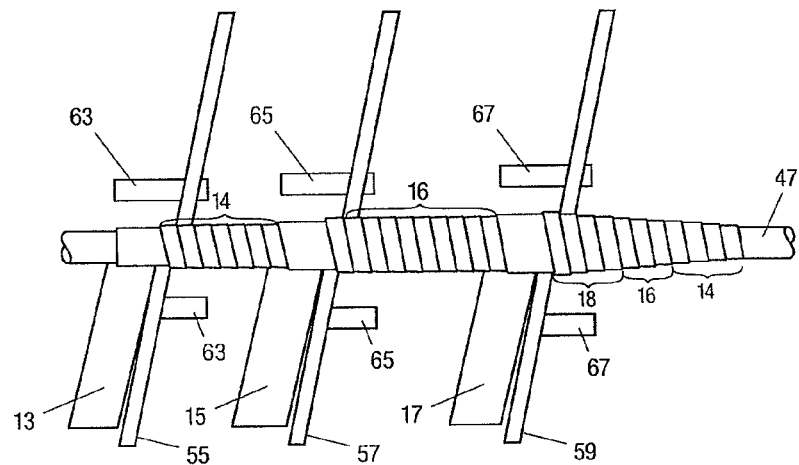
FIG. 3 is a schematic top view of three stations of the machine used to manufacture the filter element of FIG. 1.
Figure 4:
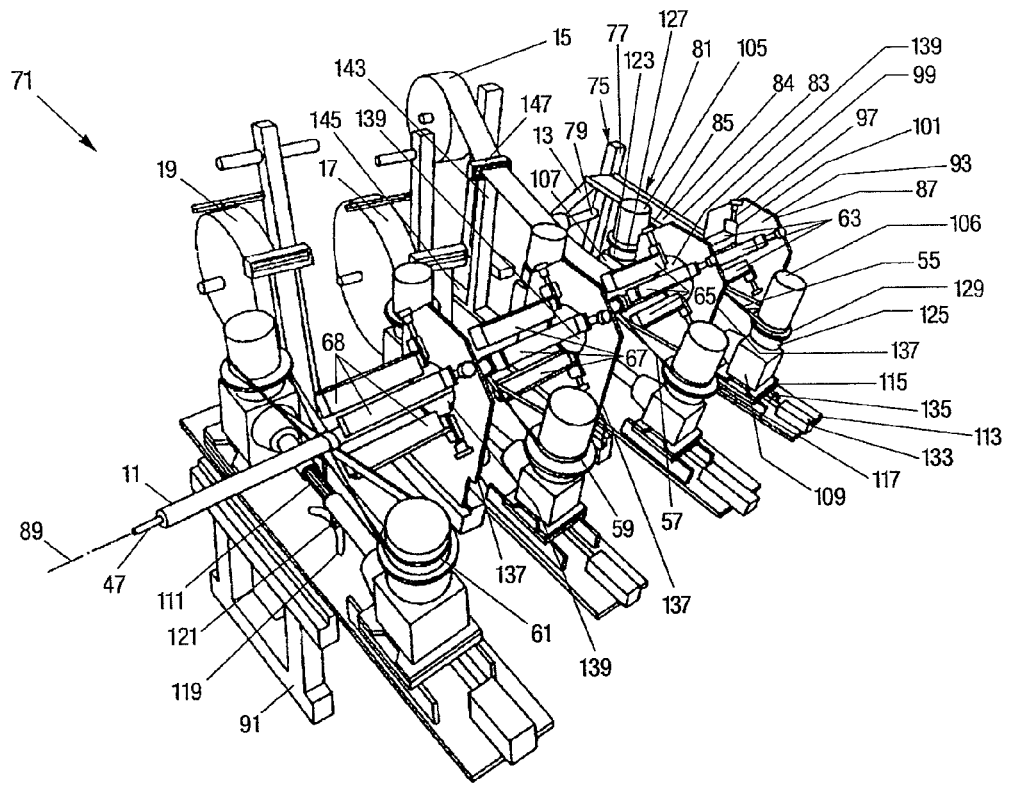
FIG. 4 is a perspective view that illustrates the preferred embodiment of a multi-stage winding machine used to that produce the filter element of FIG. 1.

As shown in FIG. 3 of the drawings, only three stages are shown of the multi-stage winding machine shown in greater detail in FIG. 4. In FIG. 3, a first compression belt 55 is shown wrapping, in a multi-overlapped fashion, nonwoven fabric strip 13 about the hollow mandrel 47. A second compression belt 57 is shown wrapping, in a multi-overlapped fashion, nonwoven fabric strip 15 about multi-overlapped nonwoven fabric strip 13. A third compression belt 59 is shown wrapping, in a multi-overlapped fashion, non-woven fabric strip 17 about multi-overlapped nonwoven fabric strip 15. A first heater array of preferably infrared heaters 63 is shown in a position to apply heat, simultaneously with the compression of compression belt 55, to multi-overlapped nonwoven fabric strip 13. A second heater array of infrared heaters 65 is shown in a position to apply heat, simultaneously with the compression of compression belt 57, to multi-overlapped nonwoven fabric strip 15. A third heater array of infrared heaters 67 is shown in a position to apply heat, simultaneously with the compression of compression belt 59, to multi-overlapped nonwoven fabric strip 17.

Referring now to FIG. 4 of the drawings, numeral 71 designates a multi-stage winding machine for manufacturing multi-overlapped coreless filter elements 11. A roll of non-woven fabric strip 13 is shown mounted on a roll support 75 consisting of an upright member 77 onto which are mounted one or more cylindrical roll support shafts 79 extending perpendicularly outward from the upright member 77 to receive the tubular core (not shown) of the roll of non-woven fabric strip 13. Each roll support shaft 79 is connected to the upright member 77 at a point along the length of the upright member 77. The upright member 77 is connected at its base to a plurality of horizontal legs (not shown) which extend perpendicularly outward to such length as to provide support for the upright member 77, each roll support shaft 79, and each roll non-woven the fabric strip 13 loaded onto each roll support shaft 79.

A feed tray 81 consists of a rectangular plate with its two longest opposing edges 83 and 85 each turned up at a right angle so as to form a channel which supports and guides and is adjustable to the width of the nonwoven fabric strip 13. Each stage of the winding machine 71 has a feed tray 81 and a tensioner roller 147 connected to an air cylinder (not shown).

Heater array support 87, a mounting plate for the first heater array 63, stands vertically in a plane which is perpendicular to the axis 89 of the winding machine 71. The heater array support 87 is connected along its base edge to a machine support structure 91 which extends parallel to the axis 89 of the winding machine 71 and supports each stage thereof. The heater array support 87 has an input surface (not shown) and an output surface 93. Connected to the output surface 93 and extending along the axis 89 and through each stage of the winding machine 71 is a hollow mandrel 47. Attached to the input surface of the heater array support 87 is a conduit (not shown) for transporting the heat exchange medium from a pumping device (represented schematically in FIG. 7, numeral 324) to the heater array support 87, through an aperture (not shown) in the heater array support 87, and into the cylindrical channel 53 (see FIG. 2) of the hollow mandrel 47. Connected to the output surface 93 of the heater array support 87 is a plurality of heater actuators 97 each of which consists of a dial adjustment mechanism 99 connected through a gear mechanism (not shown) to a heater actuator plate 101.

Attached to each heater actuator plate 101 and extending outward from the output surface 93 of the heater array support 87 and parallel to the axis 89 of the winding machine 71 is an infrared heater 63. Each infrared heater 63 is attached to a corresponding heater actuator plate 101 in such a fashion as to direct the heat perpendicular to and in the direction of the hollow mandrel 47. Each infrared heater 63 extends outward from the output surface 93 of the heater array support 87 a selected distance.

A pair of capstans consisting of a driving capstan 105 and a driven capstan 106 stand vertically with their axes (not shown) perpendicular to and on either side of the axis 89 of the winding machine 71. The driving capstan 105 is mounted onto a driving capstan gearbox 107 and the driven capstan 106 is mounted onto a driven capstan gearbox 109. The driving capstan gearbox 107 is connected at its base to a gearbox platform 113. The gearbox platform 113 is a rectangular plate that sits atop the machine support structure 91 in a horizontal plane. A capstan driving motor (not shown) is mounted underneath the gearbox platform 113 and has a shaft (not shown) which extends through an aperture (not shown) in the gearbox platform 113 and connects to the gears of the driving capstan gearbox 107. The driving capstan gearbox 107 is connected to the driven capstan gearbox 109 by a splined shaft (not shown in the first-stage, but identical to the splined shaft 111 of the fourth stage) thereby providing a means for driving the capstans 105 and 106 at the same angular speed but in opposing directions.

The driven capstan gearbox 109 is connected at its base to a gearbox sliding plate 115. The underside of the gearbox sliding plate 115 has a plurality of grooves that extend along its length and parallel to the length of the gearbox platform 113. The grooves of the gearbox sliding plate 115 receive the rails of a digital linear encoder 117 thereby allowing the digital linear encoders 117 to incrementally measure the location of the driven capstan 109 along the rails of the digital linear encoder 117 relative to a reference point on the digital linear encoder 117. The digital linear encoder 117 can be of the type disclosed in U.S. Pat. No. 4,586,760 or any other incremental linear measuring device known to persons skilled in the art. Near the center of the gearbox platform 113 and cut through the thickness of the platform is an arc-shaped slot (not shown in the first-stage, but identical to the arc-shaped slot 119 of the fourth stage), the chord of which is parallel to the length of the gearbox platform 113. A gearbox platform adjustment set screw (not shown in the first stage, but identical to the gearbox platform adjustment set screw 121 of the fourth stage) passes through the arc-shaped slot identical to slot 119 and is received into a threaded aperture (not shown) in the machine support structure 91. The angle of the belt 55 relative to the mandrel 47 may be adjusted with this mechanism.

Capstan sleeves 123 and 125 are concentric about the axes of the driving capstan 105 and the driven capstan 106, respectively. The radially interior surfaces of the capstan sleeves 123 and 125 are mated with the radially exterior surfaces of the driving capstan 105 and the driven capstan 106, respectively, and are attached thereto by suitable means at a selected location on the driving capstan 105 and on the driven capstan 106. Annular capstan sleeve flanges 127 and 129 extend radially outward from the driving capstan 105 and the driven capstan 106, respectively.

Compression belt 55 forms a closed loop around one half of the periphery of the driving capstan 105 and one half of the periphery of the driven capstan 106 and is placed in tension by the distance between the axes of the driving capstan 105 and the driven capstan 106. The compression belt crosses over itself a single time between the driving capstan 105 and the driven capstan 106. In addition, the compression belt 55 forms a single spiral around the hollow mandrel 47.

A tensioner air cylinder 133 is mounted onto the gearbox platform 113 at the same end as the driven capstan gearbox 109. The tensioner air cylinder 133 is a commonly used pneumatic cylinder with a shaft 135 that extends from one end of the tensioner air cylinder 133 in parallel with the length of the gearbox platform 113 and is connected at the opposing end to the driven capstan gearbox 109.

Three additional stages of the multi-stage winding machine 71 are shown in FIG. 4. Each such additional stage consists of identical components as the first stage with the exception that the heater array support 137 of each additional stage includes an aperture 139 concentric about the axis 89 of the winding machine 71 through which the hollow mandrel 47 passes with sufficient clearance for bands 14, 16, 18, 20 of the filter element 11; and with the exception that the feed tray 81 is replaced by a feed tensioner 141 consisting of a vertically upright member 143 connected at its base to a plurality of horizontal legs 145 and connected at the opposite end to feed tensioner rollers 147.

Figure 5:
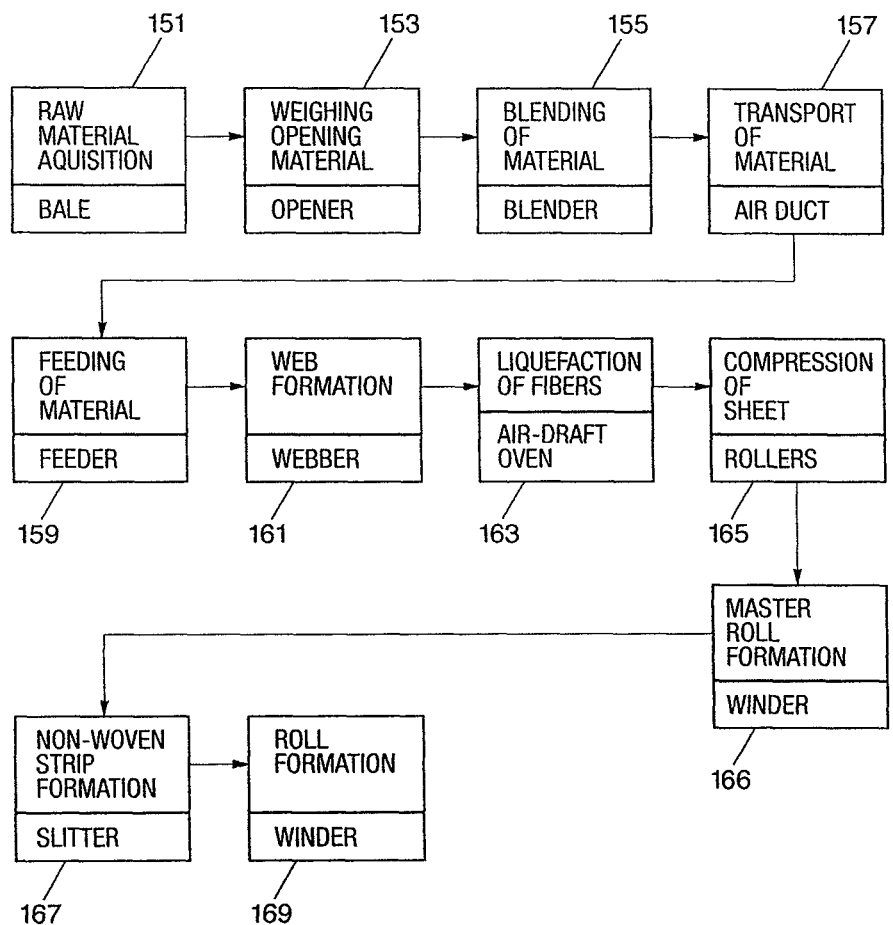
FIG. 5 is a block diagram of the preferred nonwoven fabric manufacturing process used to produce the filter element of FIG. 1.

Referring now to FIG. 5 of the drawings, a block diagram of each step of the manufacturing process of the nonwoven fabric is illustrated. Each significant step of the manufacturing process is depicted in a separate block. In block 151, step 1 is the acquisition of fiber, usually in the form of a bale purchased from a textile fiber producer. Each strip 13, 15, 17, 19 is composed of one or more fibers. If a strip 13, 15, 17, 19 is composed of only one fiber, it should be of the type which consists of a lower melting point outer shell and a higher melting point inner core. If a strip 13, 15, 17 19 is composed of two or more fibers, at least one of the fibers must have a lower melting point than the others or be of the shell and core type mentioned above.

In block 153, step 2 is opening and weighing of the fiber materials. The fibers are transported to a synchro-blender where they are further opened in preparation for final blending in block 155.

In block 155, step 3 is the final blending of the fibers whereby the individual fibers are thoroughly intermixed by a series of cylindrical rollers and lickerins to provide a homogeneous dispersion of fibers. This step is performed in a blender similar to the blender disclosed in U.S. Pat. No. 3,744,092.

In block 157, step 4 is the transportation of the thoroughly mixed fibers via an air duct system consisting of a duct approximately 12 inches in diameter through which air is circulated at a rate of approximately 1,500 feet per minute from the blender to the feeder.

In block 159, step 5 is the feeding of the intermixed fibers into a feeder similar to the feeder disclosed in U.S. Pat. No. 2,774,294 and U.S. Pat. No. 2,890,497.

Block 161, step 6 is a web formation step in which the fibers are conveyed from the feeder to a webber similar to the webber disclosed in U.S. Pat. No. 2,890,497 and U.S. Pat. No. 2,703,441, consisting of a plurality of cylindrical rollers and a lickerin such that a continuous web of the homogeneously dispersed fibers is formed.

Block 163, step 7 is a liquefaction and compression step carried out in a series of air-draft ovens and/or alternative heat sources in which a flow of air heated to a selected temperature is blown down onto the web thereby causing liquefaction of all or part of particular types of the homogeneously dispersed fibers as more fully explained hereinafter. Simultaneously with the liquefaction of all or part of particular types of the homogeneously dispersed fibers, is compression of the continuously formed web into a thin sheet. The air in the air-draft ovens is saturated to near 100% with low pressure steam. Liquid water is pumped through pipes into the air-draft ovens where it spilled onto heated stainless steel plates thereby creating low pressure steam. The saturation level required is dependent upon the temperature inside the air-draft ovens which ranges from 200 degrees to 550 degrees Fahrenheit. The steam neutralizes the static electricity created by the air which is recirculated at rates of up to 40,000 cubic feet per minute. There is a pressure differential across the web in the air-draft oven of between 4 and 8 inches of water column. Residence time for the web in the air-draft ovens is dependent upon and coordinated with the discharge rate of the web being produced at the webber.

In block 165, step 8 is the compression of the sheet of homogeneously dispersed fibers into a nonwoven fabric with a thickness required for the desired filtration efficiency by conveying the sheet between two cylindrical stainless steel rollers.

In block 166, step 8-A, is the formation of a roller of the nonwoven fabric on a winder.

In block 167, step 9 of the manufacturing process is the formation of strips from the sheet of nonwoven fabric. Cutting devices are positioned at selected spots across the width of the sheet of nonwoven fabric so as to cut the sheet into a plurality of strips of selected widths thereby forming strips of nonwoven fabric such as 13, 15, 17, 19.

In block 169, step 10 the nonwoven strips 13, 15, 17, 19 are wound onto cores which are in the form of cylindrical tubes on a commonly known winder consisting of a plurality of cylindrical rollers for aligning and winding the strips of non-woven fabric 13, 15, 17, 19 onto cores.

The entire nonwoven sheet manufacturing process takes place in a humidity-controlled environment. The relative humidity of the air in the environment ranges from 60% to 80% as measured by wet bulb/dry bulb thermometer and an enthalpy chart.

Each non-woven fabric strip 13, 15, 17, 19, is composed of selected polymeric fibers such as polyester and polypropylene which serve as both base fibers and binder fibers. Base fibers have higher melting points than binder fibers. The role of base fibers is to produce small pore structures in the coreless filter element 11. The role of the binder fiber or binder material is to bond the base fibers into a rigid filter element that does not require a separate core. The binder fibers may consist of a pure fiber or of one having a lower melting point outer shell and a higher melting point inner core. If the binder fiber is of the pure type, then it will liquefy throughout in the presence of sufficient heat. If the binder fiber has an outer shell and an inner core, then it is subjected to temperatures that liquefy only the outer shell in the presence of heat, leaving the inner core to assist the base fiber in producing small pore structures. The role therefor of the binder fiber is to liquefy either in whole or in part in the presence of heat, the liquid fraction thereof to wick onto the base fibers to form a bond point between the base fibers, thereby bonding the base fibers together upon cooling. The binder material may be in a form other than fibrous.

Referring now to a preferred embodiment of the invention, the base fibers and binder fibers are blended according to the manufacturing process set forth in FIG. 5 to form rolls of non-woven fabric strips 13, 15, 17, 19, each of a selected composition. Upon completion of the manufacture of rolls of nonwoven fabric strips 13, 15, 17, 19, the rolls thereof are loaded onto the roll support shafts 79 of the roll support 75 at each stage of the winding machine 71. Each roll support 75 is positioned to introduce the non-woven fabric strips 13, 15, 17, 19, at a selected angle to the hollow mandrel 47. The desired specifications for a multi-overlapped coreless filter element 11 are then selected in the manner set forth in U.S. Pat. No. 5,827,430, which is hereby incorporated herein by reference.

A length of the non-woven fabric strip 13 is unrolled and fed over the feed tray 81 such that it lies between the upturned edges 83 and 85 of the feed tray 81. The feed tray 81 is positioned such that the non-woven fabric strip 13 is introduced to the hollow mandrel 47 at a selected angle, and the driving capstan gearbox 107 thereafter acts to turn the driving capstan 105. The splined shaft of the first stage of the winding machine 71 transmits power to the driven capstan gearbox 109, the gears of which turn the driven capstan 106 at the same angular speed but in the opposite direction as the driving capstan 105. Friction between the interior surface of the compression belt 55 and the radially exterior surfaces of the driving capstan 105 and the driven capstan 106 allows the belt to turn with the capstans 105 and 106 without tangential slippage. The capstan sleeve flanges 127 and 129 of the capstan sleeves 123 and 125, respectively, prohibit the compression belt 55 from downward slippage on the driving and driven capstans 105 and 106, respectively.

The leading edge 31 of the non-woven fabric strip 13 is then fed between the annular exterior surface 49 of the hollow mandrel 47 and the compression belt 55 at the point where the compression belt 55 makes its single spiral loop around the hollow mandrel 47. Because the friction drag generated between the compression belt 55 and the non-woven fabric strip 13 is greater than the friction drag generated between the non-woven fabric strip 13 and the hollow mandrel 47, the coreless filter element 11 is formed in a conical helix shape and is driven along the hollow mandrel 47 toward the free end thereof. The feed angle between the non-woven fabric strip 13 and the hollow mandrel 47 is such that the non-woven fabric strip 13 overlaps itself a plurality of times as it is compressed between the compression belt 55 and the hollow mandrel 47 producing the multi-overlapped conical helix feature of the present invention. The source of the selected compressive force of the compression belt 55 is the tension in the compression belt 55 which is determined by the selected distance between the axes of the driving capstan 105 and the driven capstan 106. Since the driven capstan 106 is connected to the driven capstan gearbox 109 which is connected at its base to the gearbox sliding plate 115, the driven capstan 106 is free to translate along the rails of the digital linear encoder 117. The digital linear encoder 117 incrementally measures the location of the driven capstan gearbox 109 along the rails of the digital linear encoder 117 relative to a reference point on the digital linear encoder 117. The compressive force delivered by compression belt 55 to the nonwoven fabric strip 13 is controlled and maintained by a selected pressure in the pneumatic tensioner air cylinder 133, the shaft 135 of which is connected to the base of the driven capstan gearbox 109. The pressure in the pneumatic tensioner air cylinder 133 is adjusted according to operational inputs such that its shaft 135 is either extended or retracted thereby controlling and maintaining the compressive force delivered by compression belt 55 to the nonwoven fabric strip 13.

Applied simultaneously with the aforementioned compression to the multi-overlapped non-woven fabric strip 13 is a selected amount of heat generated by an array infrared heaters 63 located a selected distance from the non-woven fabric strip 13. Each infrared heater 63 is connected to a heater actuator plate 101 which provides for movement of each infrared heater 63 toward or away from the hollow mandrel 47. The dial adjustment mechanism 99 of the heater actuator plate 101 allows for incremental adjustment of the distance between each infrared heater 63 and the hollow mandrel 47. Each infrared heater 63 acts to heat the multi-overlapped non-woven fabric strip 13 to a selected temperature such that the base fibers of the multi-overlapped non-woven fabric strip 13 are bonded together both within the strip and between the multi-overlapped layers of band 14 by the wicking process of the liquefied binder fibers.

As the non-woven fabric strip 13 is simultaneously heated and compressed to produce the desired porosity, a heat exchange medium is pumped through the cylindrical channel 53 of the hollow mandrel 47 by a pumping device (not shown) at a selected flow rate for the purpose of maintaining a selected temperature on the exterior surface 49 of the hollow mandrel 47. One or more temperature detecting devices such as thermocouples (not shown) are in communication with the heat exchange medium for the purpose of detecting the temperature of the heat exchange medium.

The non-woven fabric strip 13 continues to be overlapped upon itself thereby forming band 14 which is driven along the hollow mandrel 47 through the apertures 139 of the heater array supports 137 of each remaining stage of the winding machine 71 in a continuous unending fashion. Once band 14 has passed through all stages of the winding machine 71 a length of the second-stage non-woven fabric strip 15 is unrolled and fed between the feed tensioner rollers 147 of a feed tensioner 141. The leading edge 35 of the non-woven fabric strip 15 is then fed between the compression belt 57 and the annular exterior surface of band 14 at the point where the compression belt 57 makes its single spiral around the hollow mandrel 47.

The nonwoven fabric strip 15 is simultaneously compressed and heated by identical means as the first-stage non-woven fabric strip 13. The non-woven fabric strip 15 continues to be overlapped upon itself, thereby forming band 16, the annular interior surface of which is bonded to the annular exterior surface of band 14. The combined bands 14 and 16 are driven along the hollow mandrel 47 through the apertures 139 of the heater array supports 137 of each remaining stage of the winding machine 71 in a continuously unending fashion. Once the combined bands 14 and 16 have passed through all remaining stages of the winding machine 71 a length of the third-stage non-woven fabric strip 17 is unrolled and fed between the feed tensioner rollers 147 of a feed tensioner 141. The leading edge 39 of the non-woven fabric strip 17 is then fed between the compression belt 59 and the annular exterior surface of band 16 at the point where the compression belt 59 makes its single spiral around the hollow mandrel 47.

The nonwoven fabric strip 17 is simultaneously compressed and heated by identical means as the first-stage non-woven fabric strip 13. The non-woven fabric strip 17 continues to be overlapped upon itself, thereby forming band 18, the annular interior surface of which is bonded to the annular exterior surface of band 16. The combined bands 14, 16, 18 are driven along the hollow mandrel 47 through the apertures 139 of the heater array supports 137 of each remaining stage of the winding machine 71 in a continuously unending fashion. Once the combined bands 14, 16, 18 have passed through all remaining stages of the winding machine 71 a length of the fourth-stage non-woven fabric strip 19 is unrolled and fed between the feed tensioner rollers 147 of a feed tensioner 141. The leading edge 43 of the non-woven fabric strip 19 is then fed between the compression belt 61 and the annular exterior surface of band 18 at the point where the compression belt 61 makes its single spiral around the hollow mandrel 47.

The non-woven fabric strip 19 continues to be overlapped upon itself, thereby forming band 20, the annular interior surface of which is bonded to the annular exterior surface of band 18. The combined bands 14, 16, 18, 20 are driven along the hollow mandrel 47 in a continuously unending fashion toward a measuring device (not shown) and a cutting device (not shown). Once the combined bands 14, 16, 18, and 20 have passed through the final stage of the winding machine 71, the filter element 11 is measured by the measuring device and cut to length by the cutting device.

The angular speed of the capstan driving motor is such that the non-woven fabric strips 13, 15, 17, 19 remain in close enough proximity to the infrared heaters 63, 65, 67, 68 for a selected duration of time so as to allow proper liquefaction of the binder fibers. Also, sufficient distance between stages is provided so that the binder fibers are allowed to partially cool thereby bonding the base fibers within each nonwoven strip 13, 15, 17, 19, between each layer thereof, and between each band 14, 16, 18, 20, providing the desired porosity between each layer and between each band 14, 16, 18, 20.

The simultaneous application of selected amounts of heat and compression to the layers of non-woven fabric strips 13, 15, 17, 19, is such that only selected properties are altered resulting in a coreless filter element 11 with sufficient structural strength to be self-supporting, i.e., requiring no structural core, while maintaining the desired porosity.

The simultaneous application of selected amounts of heat and compression to the non-woven fabric strips 13, 15, 17, 19, as described above, allow for systematic variation of the density of the layers of non-woven fabric strips 13, 15, 17, 19, across the wall of the filter element and the systematic variation of the porosity of the base fibers, of the element 11.

The direction of flow of filtrate through the filter element 11 can be either from the core toward the annular outside wall or from the annular outside wall toward the core, but in either case the filtrate flow is generally perpendicular to the axis of the filter element 11. However, due to the conical helix nature of the layers of non-woven fabric strips 13, 15, 17, 19, the pores formed by the bonded base fibers lie at an angle to the axis of the filter element 11 making it more difficult for large particles of filtrate to pass through the filter element 11.

The filter element 11 may be finished by capping the ends 25 and 27 by any suitable means known to persons skilled in the art, such as potting in a polymeric resin.

A cable-activated kill switch (not shown) extends over the length of the winding machine 71 for the purpose of halting the winding machine 71.

An example of the method and means of manufacturing a filter element of the type shown in FIG. 1 is as follows: Four different types of fibers were purchased from Hoechst Celanese of Charlotte, N.C., sold under the fiber designation "252," "121," "224," and "271". Fiber "252" was of the core and shell type, whereas fibers "121," "224," and "271" were of the single component pure type. The denier of fiber "252" was 3 and its length was 1.500 inches. The denier of fiber "121" was 1 and its length was 1.500 inches. The denier of fiber "224" was 6 and its length was 2.000 inches. The denier of fiber "271" was 15 and its length was 3.000 inches. A first blend of fibers was manufactured from fiber "121" and fiber "252" composed of 50% by weight of each fiber type. A second blend of fibers was manufactured from fiber "224" and fiber "252" composed of 50% by weight of each fiber type. A third blend of fibers was manufactured with a composition of 25% by weight of fiber "121" and 25% by weight of fiber "224" and 50% by weight of fiber "252". A fourth blend of fibers was manufactured from fiber "271" and fiber "252" composed of 50% by weight of each fiber type. Fiber "252" being of the core and shell type served as the binder fiber in each of the aforementioned blends. Each blend of fibers was manufactured according to the process set forth in FIG. 5. Each blend of fibers was formed into a web which was approximately ½ inch in thickness. The thickness of each web was reduced by approximately 50% forming a mat during its residence time of ninety seconds in the air draft ovens due to the recirculation of steam-saturated air at approximately 40,000 cubic feet per minute at a temperature of 400 degrees Fahrenheit. There was a differential pressure across the mat in the air draft ovens of 6 inches of water. Upon exiting the air draft ovens, each mat was feds between two stainless steel cylindrical rollers which compressed the thickness of each mat by approximately 50% into a sheet of non-woven fabric with a width of about 37 inches. Each 37-inch wide sheet of nonwoven fabric was cut into 6-inch wide strips 13, 15, 17, 19. The basis weight of each sheet of nonwoven fabric was determined and to be in the range of 0.5 to 1.2 ounces per square foot. As a quality assurance step, once the strips of nonwoven fabric were cut, they were tested on a Frasier air flow tester to determine air permeability in cubic feet per minute per square foot. The strips of nonwoven fabric 13, 15, 17, 19 were then loaded onto the roll support shafts 79 of the roll support 75, one roll at each stage of the winding machine 71.

The specifications of the strips of nonwoven fabric 13, 15, 17, 19 were input into the data processing system. The hollow mandrel 47 was made of stainless steel and had a nominal outside diameter of 1 inch. The heat transfer medium pumping device was started and began pumping the heat transfer medium through the hollow mandrel 47 at varying flow rates such that the temperature of the annular exterior surface 49 of the hollow mandrel 47 was maintained at 200 degrees Fahrenheit. A first-stage capstan driving motor was started at a control speed of approximately 50 hertz. The first-stage heater array 63 was turned on and supplied with a voltage of electricity sufficient to create a temperature at the hollow mandrel 47 of 300 degrees Fahrenheit.

The first band 14 of nonwoven fabric strip 13 was initiated by feeding the nonwoven fabric strip 13 between the hollow mandrel 47 and the first-stage compression belt 55. The nonwoven fabric strip 13 was helically wound in an overlapping fashion upon itself forming band 14 as it was driven under the compression belt 55 and along the hollow mandrel 47. As the outside diameter of band 14 increased, the driven capstan 106 moved toward the driving capstan 105 so as to shorten the distance therebetween and maintain a pressure of 10 pounds per square inch exerted on band 14 from compressed belt 55. This compression pressure was a result of the tension in the compression belt 55 which was developed by the pressure in the tensioner air cylinder 133 of 50 pounds per square inch gage. The movement of the driven capstan 106 was accomplished by altering the pressure in the tensioner air cylinder 133. The digital linear encoder 117 detected the movement of the driven capstan 106 and the appropriate modifications to the speed of the capstan driving motor was made, if necessary. The temperature created by the infrared heater 63 was the "ironing point" temperature. This ironing point temperature of 300 degrees Fahrenheit assisted compression and bonding of the base fibers between the layers of band 14. Under this simultaneous application of heat and compression, the thickness of the strips of nonwoven fabric 13 was compressed by approximately 50% and there existed interlayer bonding.

The band 14 was allowed to travel through each stage of the winding machine 71 and prior to encountering the compression belt at each stage, the capstan driving motor at that stage was turned on and set to the speed of the first-stage capstan driving motor.

Once the band 14 progressed through all stages of the winding machine 71, the second band 16 of nonwoven fabric strip 15 was initiated by feeding the nonwoven fabric 15 between the second-stage compression belt 57 and the annular exterior surface of band 14. The nonwoven fabric 15 was helically wound in an overlapping fashion upon itself forming band 16 as it was driven under compression belt 57 and along the hollow mandrel 47. The second-stage heater array 65 was turned on and supplied with a voltage of electricity sufficient to maintain an ironing point temperature of 300 degrees Fahrenheit at the annular exterior surface of band 16. As the outside diameter of band 16 increased, the second-stage driven capstan moved toward the second-stage driving capstan so as to shorten the distance therebetween and maintain a pressure of 10 pounds per square inch exerted on band 16 from compression belt 57. This compression pressure was a result of the tension in the compression belt 57 which was developed by the pressure in the second-stage tensioner air cylinder of 50 pounds per square inch gage. The movement of the second-stage driven capstan was accomplished by altering the pressure in the second-stage tensioner air cylinder. The second-stage digital linear encoder detected the movement of the second-stage driven capstan and the appropriate modifications to the speed of the second-stage capstan driving motor was made, if necessary, to synchronize the speed of the second-stage capstan driving motor with the first-stage capstan driving motor. The ironing point temperature of 300 degrees Fahrenheit assisted compression and bonding of the base fibers between the layers of band 16. Under this simultaneous application of heat and compression, the thickness of the nonwoven fabric strip 15 was compressed by approximately 50% and there existed interlayer bonding. The annular interior surface of band 16 was bonded to the annular exterior surface of band 14 and band 16 progressed along the hollow mandrel 47 toward the third-stage compression belt 59. The band 16 was allowed to travel through the remaining stages of the winding machine 71 and prior to encountering the compression belt at each stage, the capstan driving motor at that stage was turned on and set to the speed of the second-stage capstan driving motor.

Once the band 16 progressed through all the stages of the winding machine 71, the third band 18 of nonwoven fabric 17 was initiated by feeding the nonwoven fabric strip 17 between the third-stage compression belt 59 and the annular exterior surface of band 16. The nonwoven fabric 17 was helically wound in an overlapping fashion upon itself forming band 18 as it was driven under compression belt 59 and along the hollow mandrel 47. The third-stage heater array 67 was turned on and supplied with a voltage of electricity sufficient to maintain an ironing point temperature of 300 degrees at the annular exterior surface of band 18. As the outside diameter of band 18 increased, the third-stage driven capstan moved toward the third-stage driving capstan so as to shorten the distance therebetween and maintain a pressure of 10 pounds per square inch exerted on the band 18 from compression belt 59. This compression pressure was a result of the tension in the compression belt 59 which was developed by the pressure in the third-stage tensioner air cylinder of 50 pounds per square inch gage. The movement of the third-stage driven capstan was accomplished by altering the pressure of the third-stage tensioner air cylinder. The third-stage digital linear encoder detected the movement of the third-stage driven capstan and appropriate modifications to the speed of the third-stage capstan driving motor was made, if necessary, to synchronize the speed of the third-stage capstan driving motor with the first-stage capstan driving motor. The ironing point temperature of 300 degrees Fahrenheit assisted compression and bonding of the base fibers between the layers of band 18. Under this simultaneous application of heat and compression, the thickness of nonwoven fabric strip 17 was compressed by approximately 50% and there existed interlayer bonding. The annular interior surface of band 18 was bonded to the annular exterior surface of band 16 and band 18 progressed along the hollow mandrel 47 toward the fourth stage compression belt 61. The band 18 was allowed to travel through the remaining stage of the winding machine 71 and prior to encountering the fourth-stage compression belt, the fourth-stage capstan driving motor was set to the speed of the third-stage capstan driving motor.

Once the band 18 progressed through all the remaining stage of the winding machine 71, the fourth band 20 of nonwoven fabric strip 19 was initiated by feeding the nonwoven fabric strip 19 between the fourth-stage compression belt 61 and the annular exterior surface of band 18. The nonwoven fabric strip 19 was helically wound in an overlapping fashion upon itself forming band 20 as it was driven under compression belt 61 and along the hollow mandrel 47. The fourth-stage heater array 68 was turned on and supplied with a voltage of electricity sufficient to maintain an ironing point temperature of 300 degrees at the annular exterior surface of band 20. As the outside diameter of band 20 increased, the fourth-stage driven capstan moved toward the fourth-stage driving capstan so as to shorten the distance therebetween and maintain a pressure of 10 pounds per square inch exerted on the band 20 from compression belt 61. This compression pressure was a result of the tension in the compression belt 61 which was developed by the pressure in the fourth-stage tensioner air cylinder of 50 pounds per square inch gage. The movement of the fourth-stage driven capstan was accomplished by altering the pressure of the fourth-stage tensioner air cylinder. The fourth-stage digital linear encoder detected the movement of the fourth-stage driven capstan and appropriate modifications to the speed of the fourth-stage capstan driving motor was made, if necessary, to synchronize the speed of the fourth-stage capstan driving motor with the first-stage capstan driving motor. The ironing point temperature of 300 degrees Fahrenheit assisted compression and bonding of the base fibers between the layers of band 20. Under this simultaneous application of heat and compression, the thickness of nonwoven fabric strip 19 was compressed by approximately 50% and there existed interlayer bonding. The annular interior surface of band 20 was bonded to the annular exterior surface of band 18 and band 20 progressed along the hollow mandrel 47 toward the measuring and cutting devices whereby it was measured and cut to a length of 30 inches.

The resulting filter element 11 had a 1-inch nominal inside diameter, a 2.5-inch nominal outside diameter and was cut to 30 inches long. It weighed one pound and had an airflow capacity of 20 cubic feet per minute, producing a 4.9 inches of water column differential pressure.

In an alternate embodiment of the invention, an idler belt may be included at one or more stages of the multi-stage winding machine 71 so as to maintain the hollow mandrel 47 in a properly fixed position.

In another embodiment of the invention, a plurality of non-woven fabric strips are added in a single stage of the multi-stage winding machine 71.

It is noted that the process for making the filter element of the present invention, as described above, provides the filter element with a surface area that includes multiple overlapping layers of media (i.e., bands) whereby adjacent layers have an intersection plane at the point of joining. Such a design, in an embodiment, can enhance the filtration capacity of the bands. Moreover, with such a design, a gradient of density within the filter element 11 can be provided across the depth of the filter element 11.

Before proceeding further, it may be useful to define some of the terms being used hereinafter. "Pore size" is an indication of the size of the pores in the media, which determines the size of particles unable to pass through the media, i.e. micron rating. For most media, this may be related as a distribution, since the pore size may not be uniform throughout. "Permeability" is a measure of the resistance of the media to flow. This can be measured in air or in a liquid. A higher permeability means less resistance to flow and a lower pressure drop across the media for a given flow. A lower permeability means more resistance to flow or a high pressure drop across the media for a given flow. "Fiber size" is a measure of the size of the fibers in the media. This is measured in microns, or for polymers, denier. Generally, the smaller the fiber, the smaller the pores in the media. There is generally a distribution of fiber sizes which can change based upon design. "Basis Weight" is how much the media weighs for a given surface area. This is generally measured in pounds (lbs.) per square yard, or grams per square meter. "Porosity" (Void volume) is a measure of how much of the media volume is open space. Generally, a higher porosity indicates a higher dirt holding capability within the media and a higher permeability.

As noted above, the material used and the method of manufacture can influence the characteristics of the media. To that end, the characteristics of the media can be utilized to develop a filter that may have a relatively significant filtration capacity. It is well established that the three primary measures of filtration performance, that is, flow capacity, micron rating, and particle holding capacity, can be proportionately related to one another. For example, as the micron rating becomes tighter, the flow capacity tends to decrease. Likewise, as the micron rating becomes tighter, the particle holding capacity tends to decrease. Accordingly, based on these characteristics, a filter element can be designed, in accordance with an embodiment of the present invention, whose filtration capacity can provide the ability to remove contaminant, while having relatively high particle holding and flow capacity, and the ability to maintain a specified micron rating.

With reference to another embodiment of the present invention, to further enhance the filtration capacity of filter element 11, the present invention may provide the filter element with an interlay of media within at least one of bands 14, 16, 18 or 20. The presence of such an interlay in the filter element 11 can, in an embodiment, provide the filter element 11 with additional surface area for filtration. In particular, to the extent that the interlay may be different in characteristics and properties from the underlying filter element bands 14, 16, 18 and 20, there can be a distinct and abrupt change in density, fiber size, etc., that, in effect, create additional surface area within the contiguous construction of a filter element of the present invention. This interlay can also create the ability to change direction of flow and to increase the deposition of specifically sized contaminants.

Figure 6A:
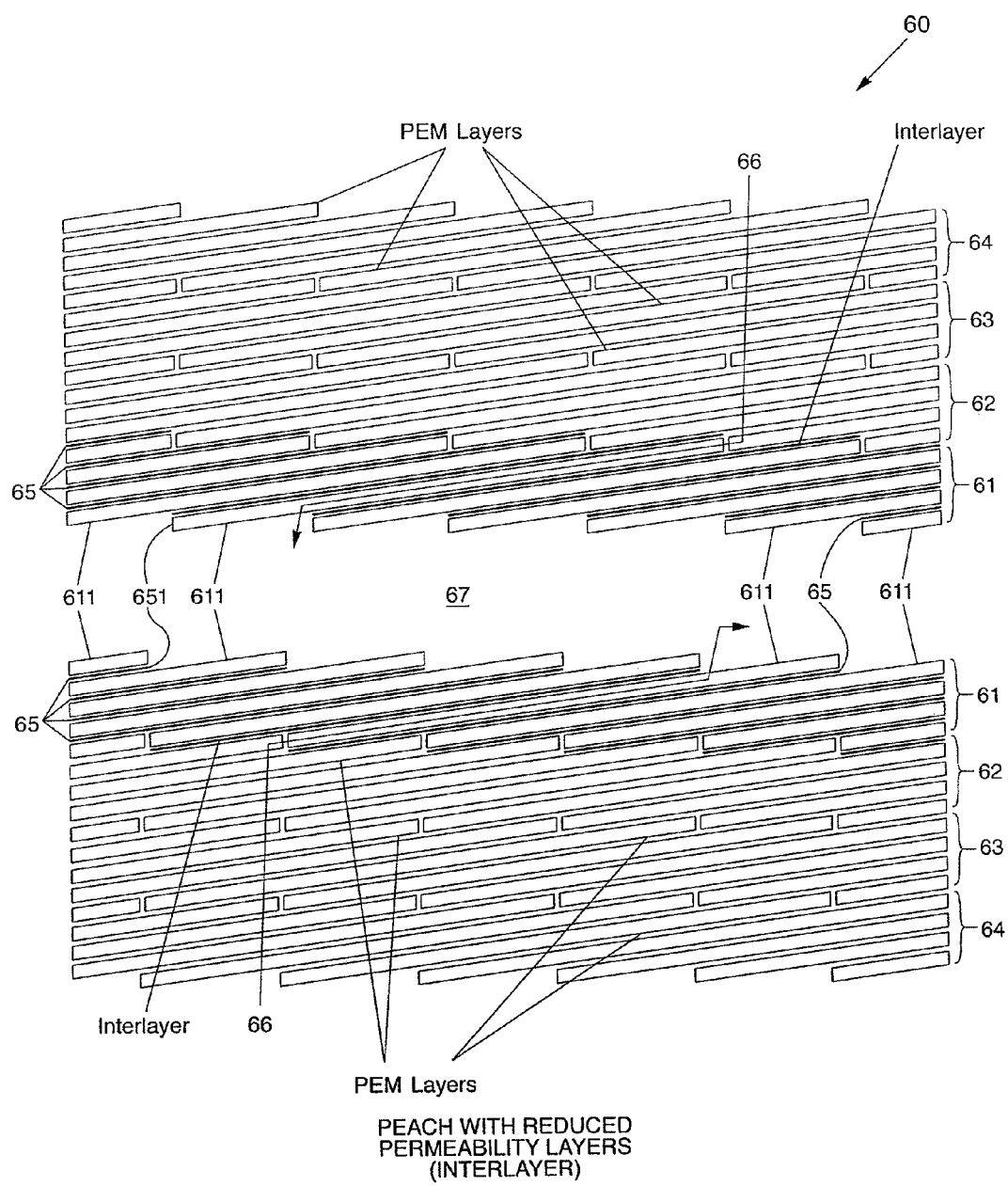
FIG. 6A illustrate a cross-sectional view of a multi-overlapped coreless filter element having an interlaying band in accordance with another embodiment of the present invention.

Looking now at FIG. 6A, there is illustrated a cross-sectional view of a multi-overlapped coreless filter element 60, in accordance with one embodiment of the present invention. Filter element 60, as illustrated in FIG. 6A, may be manufactured using the process described above. To that end, similar to filter element 11, filter element 60 can include multiple bands 61, 62, 63 and 64. Of course, additional or fewer bands may be provided should that be desired. Filter element 60 can further include an interlay 65 disposed within at least one over-lapping band, such as band 61. The presence of interlay 65 within overlapping band 61 of filter element 60 can allow the filter element 60 to be designed in such a way as to control and impart a particular filtration or flow pattern of the fluid moving within filter element 60, for instance, in a substantially axially direction.

In accordance with an embodiment of the present invention, interlay 65 may be made from a material or materials that can provide characteristics different from those of the bands 61 to 64. In one embodiment, these characteristics may be imparted based on the size of, for instance, the fibers, as well as the process or recipe used in making the interlay 65. In general, the fibers used can come in different diameters, typically micron (i.e., 1/1,000,000 meter) in size. The diameter may also be described in denier. A denier is the weight in grams of 9,000 meters of the fiber. Using the density of, for instance, the polymer in the fiber, the diameter of the fiber can be calculated from the denier. In an embodiment, the interlay 65 can be made up from a mixture of fibers of widely different diameters. This mixture or recipe can determine the performance or characteristics of the interlay 65, and depending of the application, the performance or characteristics of interlay 65 can be substantially different or slightly different than the characteristics or performance of bands 61 to 64.

Examples of materials that can be used in the manufacture of interlay 65 can vary widely including metals, such as stainless steel, inorganic components, like fiberglass or ceramic, organic cellulose, paper, or organic polymers, such as polypropylene, polyester, nylon, etc., or a combination thereof. These materials have different chemical resistance and other properties.

Figure 6B:
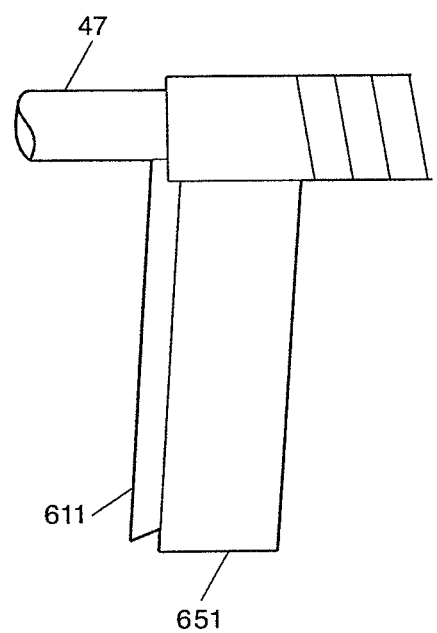
FIG. 6B illustrates a strip for forming an interlaying band positioned against a surface of a strip for forming a band of the filter element for simultaneous winding to provide the configuration shown in FIG. 6A.

In addition, looking now at FIG. 6B, interlay 65, in one embodiment, may be provided from a strip, such as strip 651, with a width substantially similar in size to that of a strip, such as strip 611, being used in making the band within which the interlay 65 is disposed. Alternatively, the interlay 65 may be provided from a strip with a width measurably less than the width of the strip used in the band within which the interlay 65 is disposed. In an embodiment, the interlay 65 may include a width approximately 2 inches less than the width of the strip used in the band.

To dispose the interlay 65 in the manner illustrated in FIG. 6A, at the beginning of the manufacturing process, strip 651 from which interlay 65 is formed may be placed substantially parallel to and against a surface of, for example, strip 611 used in the formation of, for instance, band 61. Strip 611, manufactured by the process indicated above, can be non-woven in nature. In an embodiment, the strip 651, which can also be non-woven or otherwise, may be placed against a surface of strip 611 that subsequently can become an inner surface of band 61. Alternatively, strip 651 may be placed against a surface of strip 611 that subsequently can become an outer surface of band 61. Thereafter, as strip 611 is wound about mandrel 47 to form band 61, the strip 651 can be wound simultaneously along with strip 611 of band 61 to provide the configuration shown in FIG. 6A. In other words, for example, each layer of the interlaying strip 651 may be sandwiched between two adjacent overlapping layers of the non-woven strip 611. It should be noted that the interlay 65 within band 61 is provided above and below pathway 67 formed by the mandrel 47 during the winding process, such as that illustrated in FIG. 6A. Moreover, despite being illustrated in connection only with band 61, it should be appreciated that interlay 65 may be disposed within one or more of the remaining bands 62 to 64. Furthermore, each interlay 65 in each of bands 61 to 64, in an embodiment, may be provided with different or similar characteristics to the other interlays, depending on the particular application or performance desired.

Figure 7:
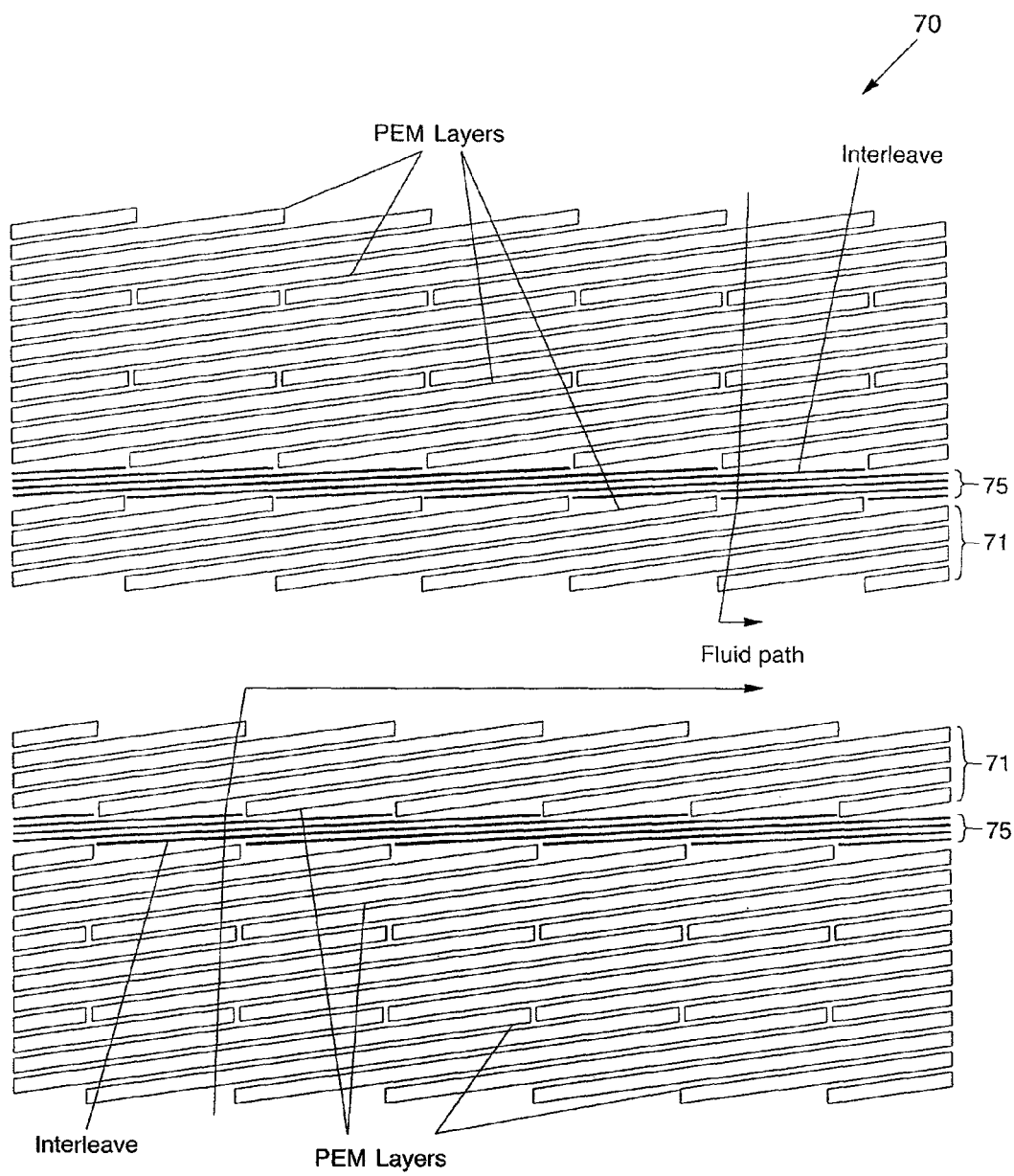
FIG. 7 illustrates a cross-section view of another multi-overlapped coreless filter element having an interleafing band in accordance with one embodiment of the present invention.

In an alternate embodiment, as illustrated in FIG. 7, instead of providing interlay 65 within overlapping band 61, an interleaf 75 may provided circumferentially about overlapping band 71. To dispose the interleaf 75 in the manner illustrated in FIG. 7, in one embodiment, subsequent to the formation of overlapping band 71, a strip, used in the formation of interleaf 75, may be wrapped or wound in an overlapping manner similar to that for band 71 about an exterior surface of band 71 to provide an overlapping profile exhibited by interleaf 75 in FIG. 7. Of course, although illustrated with only one interleaf, interleaf 75 may be provided about one or more of the remaining bands in filter element 70.

Figure 8:
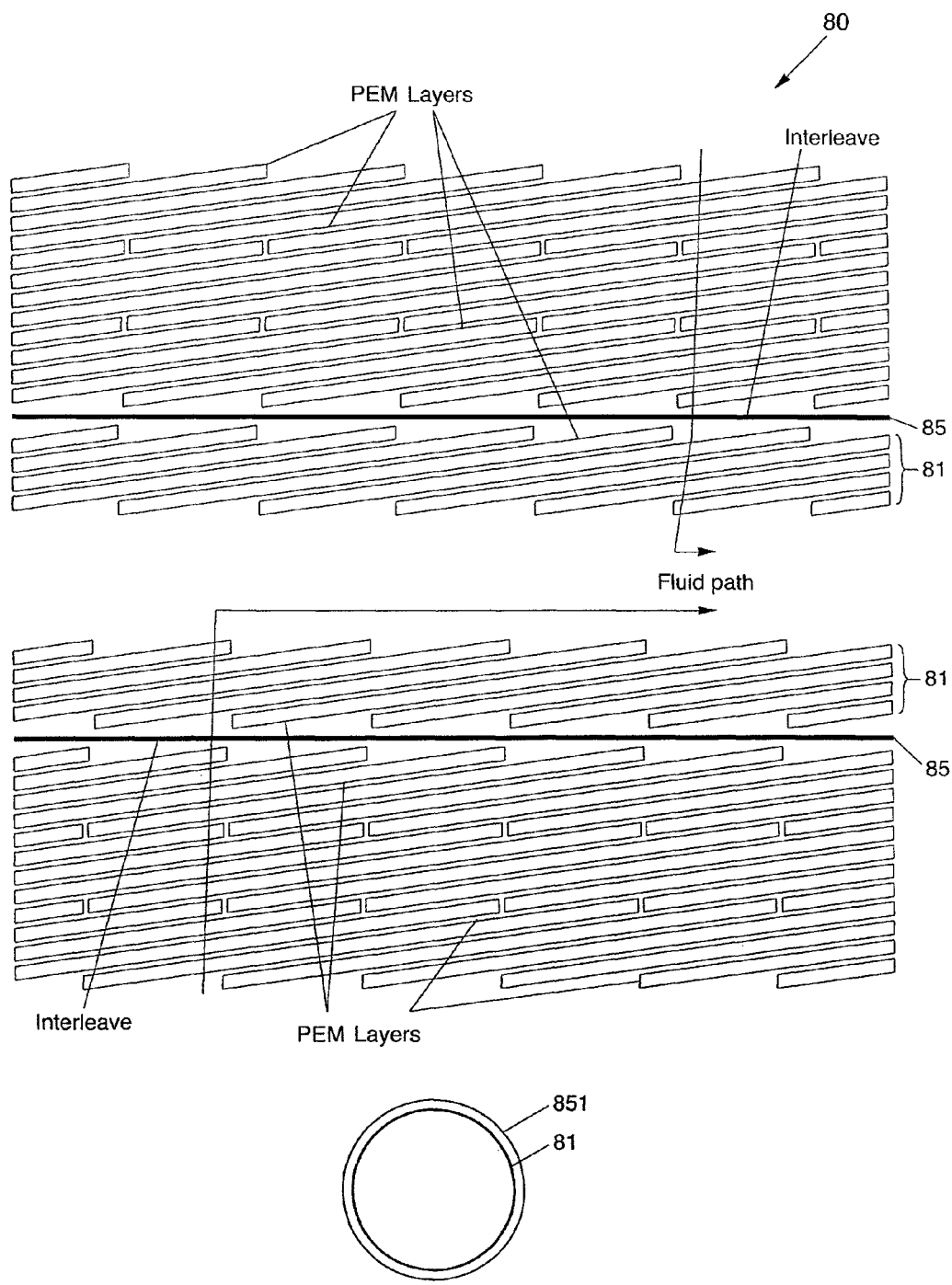
FIG. 8 illustrates a cross-section view of a multi-overlapped coreless filter element having another interleafing band in accordance with another embodiment of the present invention

Alternatively, rather than providing an overlapping interleaf 75, an interleaf 85, looking now at FIG. 8, may be disposed as one layer along an entire length of filter element 80 and within band 81. In this embodiment, strip 851 may be provided with a length substantially similar to that of filter element 80 and a width substantially similar to a circumference of band 81. That way, band 81 of filter element 80 may be positioned along the length of strip 851 and the width of strip 851 subsequently wrapped once about band 81. This, of course, can be done during the formation of band 81, so that interleaf 85 may be provided within band 81, or after the formation of band 81, so that interleaf 85 may be provided about an exterior surface of band 81. Interleaf 85 may also be provided about one or more of the remaining bands in filter element 80.

In a related embodiment, strip 851 may be provided with a length shorter than that of filter element 80. With a shorter length, interleaf 85 may be provided about each band of filter element 80 and in a staggered manner from one band to the next (not shown).

In addition to the materials (e.g., types and sizes), the characteristics or properties of the interlay 65 as well as bands 61 to 64, which may be referred to hereinafter as media, can be dependent on pore size, permeability, basis weight, and porosity (void volume) among others. The combination of these properties can provide the interlay 65, along with bands 61 to 64, with a particular flow capacity (differential pressure of fluid across the filter), micron rating (the size of the particles that will be removed from the filter element 60, particle holding capacity (the amount of contaminant that can be removed from the process by the filter element 60 before it becomes plugged), and physico-chemical properties.

Moreover, by providing filter element 60 with interlay 65 having different characteristics and properties from those exhibited by the multiple overlapping bands 61 to 64, there can be, for example, a distinct and abrupt change in density within the filter element 60 that, in effect, can create additional surface area, thereby allowing for the generation of a gradient density within filter element 60 at a micro level as well as a macro level.

The presence of interlay 65 within filter element 60 can also impart, in an embodiment, a substantially axial fluid flow pathway along the filter element 60. Generally, the flow of fluid through the overlapping bands, for example, bands 61 to 64, is in a substantial radial direction across the element 60 either from outside to inside or from inside to outside. However, using an interlay of more dense or less permeable media, as described above, the flow of the fluid across filter element 60 can be directed substantially axially along the length of the filter element 60, as illustrated by arrow 66 in FIG. 6A.

A well established fact in filtration using depth media, such as filter element 60, is the ability to remove particles that are relatively smaller than the pore size. Very small particles in a gas, for instance, can move randomly in what has been described Brownian motion. These particles can come in contact with fibers or liquid held in a filter element, and may be removed even though, by their size, they can easily pass through the larger pores within bands of the filter element. In addition, particles in a fluid tend to have more mass than the fluid within which they are found. As a result, there is a tendency for the particles to flow in a relatively straight line. Such a flow pattern can create an inertial impaction of the particles with a fiber, allow the particles to stick to the fiber and be removed. Again, even though these particles may be small enough to pass through the pores of the filter, they are nevertheless removed.

Both of these removal mechanisms, in an embodiment, can likely increase filtration capacity as the path along which the particles must travel through the filter element becomes more tortuous and/or longer. In particular, with a more tortuous and/or longer travel path, contact probability by the particle can increase. Contact probability is the probability that a particle will come in contact with a fiber or, in the case that the fluid is a gas, come in contact with liquid held within the filter element, which allows its removal. Accordingly, by imparting axial flow along the filter element, filter element 60 of the present invention can substantially increase its ability to remove relatively small particles while increasing its the flow capacity (i.e., removal of micron sized particles while providing larger particle holding and flow capacity.)

For example, in a liquid filter element having an outside diameter (OD) of about 2.5" and an inside diameter (ID) 1.19", the radial depth of the filter element may be about 0.655". With such a filter element, a particle or contaminant may typically flow radially approximately 0.665" in order to pass through this filter. On the other hand, when such a filter is provided with an interlay approximately 4.0" in width, for instance, interlay 65, within one band, such as band 61 in FIG. 6A, the particle flowing through the filter element must now flow along a direction illustrated by arrow 66. Depending on where the particle comes into contact with interlay 65, whether at point A or B or somewhere in between the particle may travel for approximately up to 4.665" before it can pass through the filter element. Such a distance is up to about 7.1 times the distance without the interlay, thus, greatly increasing the contact probability for removal of the contaminant. Of course, if another 4" interlay were provided within a second band, the distance traveled would be up to 8.665" or 13.2 times that of a filter element without an interlay.

Using the interlay 65 of the present invention, along with the characteristics that can be imparted to each of the bands 61 to 64, a filter element may be made whereby a specifically designed flow pattern (i.e., direction of fluid flow) can be imparted to a fluid moving through the filter element. In particular, between two extremes, if, for example, the interlay 65 is substantially impermeable, then axial flow can be mandated through the band within which the interlay 65 may be disposed until the flow reaches an exit end of the band. If, on the other hand, the interlay 65 is substantially similar in characteristics and properties to the band within which the interlay 65 may be disposed, then the flow through that band is likely to continue in a substantially radial direction through the interlay and band with little or no axial flow.

The ability of design a specific flow pattern across the filter element depends on finding a right balance and combination between the two extremes described above. In an embodiment, the interlay 65 may be designed to be more dense and less permeable than the band within which the interlay is disposed. As such, when the fluid containing contaminant reaches the interlay 65, the direction of flow may either be through the interlay or axially, depending on the content of the fluid. The direction of flow, in an embodiment, may be dictated by the pore size, permeability and other characteristics imparted to the band and the interlay 65.

To the extent that the relatively dense interlay 65 may be permeable, in one embodiment, a cross flow filtration can be permitted through the interlay 65. Specifically, as fluid flows along the interlay 65, the fluid may be permitted to flow across the permeable interlay 65, leaving the contaminant behind. Over the life of the filter element, as the relatively dense interlay 65 becomes plugged with contaminants, fluid flowing along the interlay 65 may be forced to flow through an alternate flow path, e.g., in the direction of arrow 66 in FIG. 6A, through the more permeable band having greater void volume.

It should be appreciated that when using an interlay made with a material different than that used for the band within which the interlay is disposed, it may be possible to establish electrostatic charges due to a physico-chemical interaction of the two different materials in close proximity. The generation of electrostatic charges due to such physico-chemical interaction can lead to the manufacture of a filter element containing a wide variety of fiber sizes. In addition, such interaction can lead to the manufacture of a diverse fiber matrix with different fibers in different locations. Examples of fibers that may be employed in the manufacture of the interlay and bands of the filter element of the present invention include fine fibers, including those from fiberglass, melt blown, or recent nano-fiber or nanoparticle advancements.

To the extent that nanoparticles may be incorporated into the interlay 65, such nanoparticles may be a waste adsorbent material capable of removing heavy metal contaminants, such as inorganic mercury (e.g., divalent cation $Hg^{2+}$, monovalent $Hg_2^{2+}$, and neutral compounds such as $HgCl_2$, $Hg[OH]_2$,), organic mercury, such as methylmercury (e.g., $CH_3HgCH_3$ or $CH_3Hg^+$) as a result of enzymatic reaction in the sludge, metallic mercury, silver, lead, uranium, plutonium, neptunium, americium, cadmium and combinations thereof.

The waste adsorbent material, in an embodiment, may be a nanosorbent material manufactured from self-assembled monolayers on mesoporous supports (SAMMS). The support may be made from various porous materials, including silica. An example of a SAMMS material that can be used in connection with the present invention includes thiol-SAMMS, such as that disclosed in U.S. Pat. No. 6,326,326, which patent is hereby incorporated herein by reference.

In accordance with one embodiment of the present invention, the nanosorbent material may be porous particles ranging from about 5 microns to about 200 microns in size. In an embodiment, the particles, on average, may range from about 50 microns to about 80 microns in size, may include a pore size ranging from about 3 nanometers (nm) to about 4 nm, and may be provided with an apparent density of ranging from about 0.2 grams/milliliter to about 0.4 grams/milliliter.

The interlay design of the present invention, as noted above, may be used in connection with a filter element to treat contaminated fluid. Contaminated fluid that may be treated includes viscous fluid, such as oil, or non-viscous fluid, such as a liquid or a gas. In an application involving gas/liquid coalescence a challenge may arise involving removal of very fine aerosols, while maintaining the life of the coalescing element over an extended period of time in the presence of solid contaminants. It has been observed that by using an interlay design of the present invention, very fine aerosols can be captured in the fine fibers of the interlay and can coalesce into droplets, which droplets eventually form a fluid flow down an axial path. The axial flow of the droplets/fluid, in an embodiment, can increase the life of the coalescing element by allowing some of the contaminants to be removed in the drained liquids rather than remain caught in the interlay and subsequently plugging it up. To a certain extent, this imparts a self-cleaning effect on the interlay, which can extend its life in service.

In an alternate embodiment, an interlay that is less dense and more open than the band within which it is disposed may also be used in an application involving gas/liquid coalescence. In such an embodiment, an area within the coalescing element may be created where contaminants can build up and be deposited.

Moreover, it should be appreciated that when an interleaf, such as interleaf 85, is designed to be substantially more dense and less impermeable than the band around which it is wrapped, fluid flowing through the filter element may be forced to move substantially along the entire length of the filter element, since the fluid may not be able to traverse across the dense interleaf.

While the invention has been described in connection with the specific embodiments thereof, it will be understood that it is capable of further modification. Furthermore, this application is intended to cover any variations, uses, or adaptations of the invention, including such departures from the present disclosure as come within known or customary practice in the art to which the invention pertains.

What is claimed is:

1. A filter element comprising:
   a non-woven strip having a selected porosity and being spirally wound upon itself in multiple overlapping layers to form at least one band of a selected radial thickness and defining an axially extending coreless pathway;
   an interlaying strip disposed as a single layer at a selected radial depth towards the coreless pathway, the interlaying strip and having a porosity less permeable from that of the non-woven strip; and
   a fluid flow pathway defined by the interlaying strip, so as to control and impart a particular flow pattern substantially axially along and through the filter element.

2. The filter element as set forth in claim 1, wherein the interlaying strip is disposed within the band formed by the non-woven strip.

3. The filter element as set forth in claim 1, wherein the interlaying strip is disposed about an exterior surface of the band formed by the non-woven strip and at a selected radial depth.

4. The filter element as set forth in claim 1, wherein the interlaying strip is positioned along the length of the non-woven strip.

5. The filter element as set forth in claim 1, wherein the non-woven strip has a shorter length than that of the filter element.

6. The filter element as set forth in claim 1, further comprising a second non-woven strip having a selected porosity and being spirally wound upon itself in multiple overlapping layers to form a second band of a selected radial thickness.

7. The filter element as set forth in claim 6, further comprising a second interlaying strip having a porosity less permeable from that of the second non-woven strip, the interlaying strip being disposed as a single layer at a selected radial depth about the band formed by the second non-woven strip, wherein the interlaying strips provided about the first band and about the second band are disposed in a staggered manner from the first band to the second band.

8. The filter element as set forth in claim 1, wherein the non-woven strip is helically wound, and thermally fused and compressed, so as to be substantially tubular in shape.

9. The filter element as set forth in claim 1, wherein the non-woven strip is made from a material that can induce electrostatic charges due a physico-chemical interaction between the non-woven strip and the interlaying strip.

10. The filter element as set forth in claim 1, wherein the interlaying strip is designed to remove particles or contaminants smaller in size than those removed by the non-woven strip.

11. The filter element as set forth in claim 1, wherein a material from which the interlaying strip is made includes one of metals, inorganic components, organic cellulose, organic polymers, or a combination thereof.

12. The filter element as set forth in claim 1, wherein a material from which the interlaying strip is made includes one of stainless steel, fiberglass, meltblown fibers, ceramic, paper, polypropylene, polyester, nylon, other polymeric materials, porous particles made from self-assembled monolayers on mesoporous supports (SAMMS), or a combination thereof.

13. The filter element as set forth in claim 12, wherein the porous particles are made from silica.

14. The filter element as set forth in claim 12, wherein the porous particles have a pore size ranging from about 3 nanometers (nm) to about 4 nm.

15. The filter element as set forth in claim 1, wherein the interlaying strip is made from a material different than that used for the non-woven strip.

16. The filter element as set forth in claim 1, wherein the interlaying strip can be designed to provide a particular flow capacity, micron rating, particle holding capacity, and physico-chemical property.

17. The filter element as set forth in claim 1, wherein the fluid flow pathway defined by the interlaying strip is designed to provide a long and tortuous path along which the fluid flows through the filter element.

18. The filter element as set forth in claim 1, wherein the fluid flow pathway defined by the interlaying strip is designed so that, through inertial impaction or Brownian motion of particles in the fluid flow, particles relatively smaller in size than the pore size in the filter element can be removed.

19. The filter element as set forth in claim 1, wherein the interlaying strip is disposed along the entire length of the filter element.

* * * * *